(12) United States Patent
Ionescu et al.

(10) Patent No.: US 8,737,000 B2
(45) Date of Patent: May 27, 2014

(54) GAIN CONTROL FOR LATENCY TESTING

(75) Inventors: Stefan Andrei Ionescu, Burnsville, MN (US); Bruce Douglas Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 163 days.

(21) Appl. No.: 13/550,308

(22) Filed: Jul. 16, 2012

(65) Prior Publication Data

US 2014/0016222 A1 Jan. 16, 2014

(51) Int. Cl.
*G11B 5/09* (2006.01)
(52) U.S. Cl.
USPC .................................. 360/46; 360/31; 360/67
(58) Field of Classification Search
None
See application file for complete search history.

(56) References Cited

U.S. PATENT DOCUMENTS

| | | | |
|---|---|---|---|
| 7,133,233 B1 | 11/2006 | Ray et al. | |
| 7,477,467 B1 | 1/2009 | Sutardja | |
| 7,876,517 B2 | 1/2011 | Buch et al. | |
| 7,880,999 B2 | 2/2011 | Benakli et al. | |
| 7,969,676 B2 | 6/2011 | Buch et al. | |
| 2013/0019131 A1* | 1/2013 | Tetzlaff et al. | 714/719 |

* cited by examiner

*Primary Examiner* — Paul Huber
(74) *Attorney, Agent, or Firm* — Hollingsworth Davis, LLC

(57) ABSTRACT

Approaches for determining the timing latency of a communication path are described. Some embodiments involve a method for testing timing latency. A signal is driven on a first data path and is returned through a second data path through a loop back element. The timing latency of at least a portion of the communication path that includes the first data path and the second data path is tested using the signal returned on the second data path. The gain of the second data path is adjusted to a test value during the testing of the timing latency.

20 Claims, 12 Drawing Sheets

GAIN CONTROL FOR LATENCY TESTING

SUMMARY

Approaches for determining the timing latency of a communication path are discussed in this disclosure. Some embodiments involve a method for testing timing latency. A signal is driven on a first data path and is returned through a second data path through a loop back element. The timing latency of at least a portion of the communication path that includes the first data path and the second data path is tested using the signal returned on the second data path. The gain of the second data path is adjusted to a test value during the testing of the timing latency.

Some embodiments involve a device that includes a first data path configured to carry a signal and a second data path configured to return the signal. The second data path includes a gain control element. A loop back element electrically couples the first data path to the second data path. The device includes circuitry configured to control the gain element to modify the gain of the second data path during a timing latency test. The circuitry causes a signal to be applied to the first data path and detects the return signal on the second data. The circuitry is further configured to determine a timing latency of at least a portion of a communication path that includes the first data path and the second data path using the return signal.

DETAILED DESCRIPTION

Figure 1A:
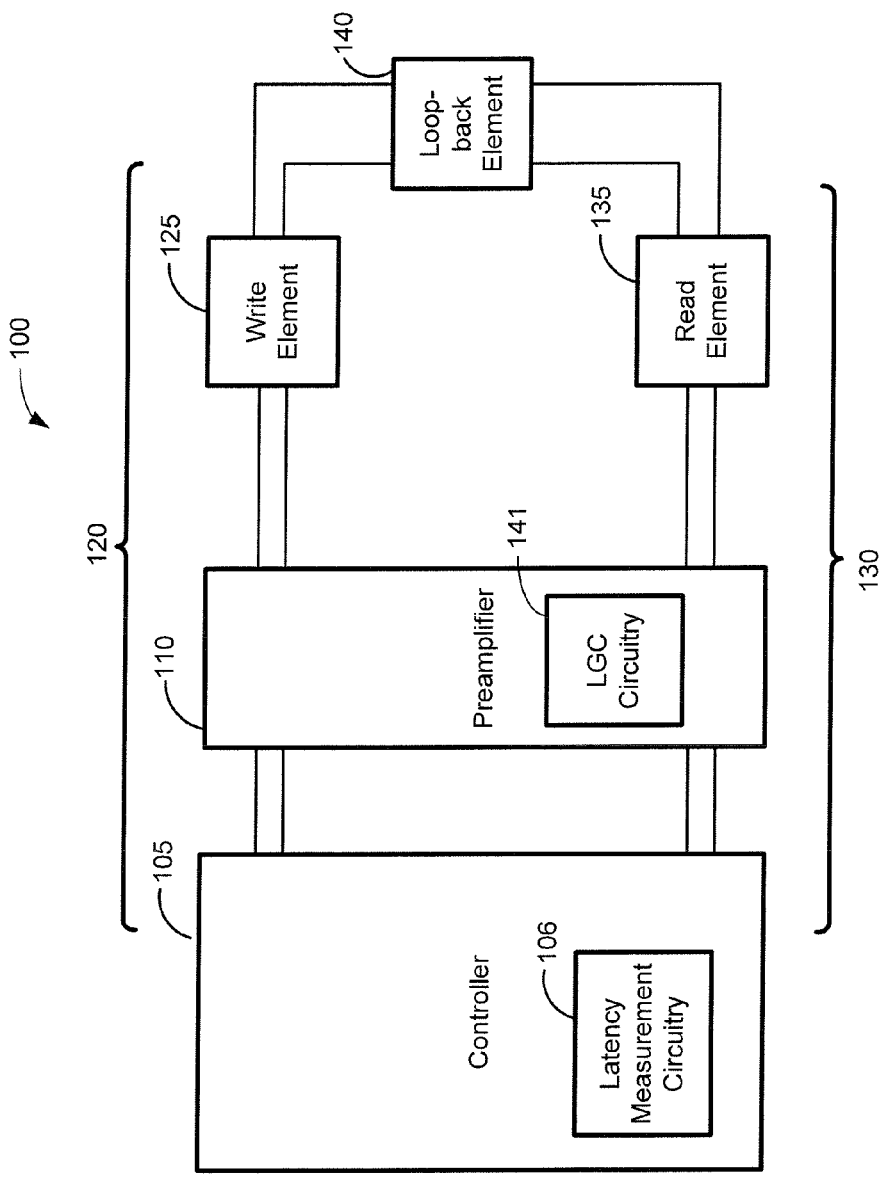
FIGS. 1A-1B are block diagrams of communication systems capable of determining timing latency of a communication path according to various implementations.

Many storage systems and communication systems experience latencies in the electronics or other portions of the system. More specifically, signals are processed and passed through various electronics and wireless or wired communication links. An amount of time is associated with the signals traveling on such paths, which can be accounted for when precise measurements or positioning is required. For example, an amount of latency occurs on the write-read path in a magnetic recording storage system. The storage device may be of various types comprising, magnetic data storage drives, solid state drives, and/or hybrid drives that incorporate both magnetic drives and solid state media. A magnetic recording storage system may include, for example, hard disk drives (HDDs) that manage a large capacity of information being written to and retrieved from the media controlled by the drive. A hard disk drive includes I/O interfaces, read and write transducer components, encoding and decoding components and servo mechanisms that appropriately position the respective transducers over the recording media. Such systems use positioning by reference to the read location in order to determine the correct write location. To do so requires an adjustment between the read location to account for the small distance between the read transducer and the write transducer for the write operation. In addition to the actual distance, the latency due to the electronics may also be taken into account.

One example of the type of system in which such a positioning technique is employed is a system that is based upon Bit Patterned Media (BPM). In a recording device that uses BPM, a single magnetic domain is provided in a predefined magnetic island per bit, instead of the multiple grains of magnetic material per bit found in continuous recording. The single domain feature of BPM allows the potential for higher areal density by obviating some of the constraints of continuous recording. Efficient utilization of BPM capacity requires synchronous writing. Thus, the timing of the write clock must be controlled, which requires calculations including the phase difference between the read transducer and the write transducer based upon a known read location. This phase difference consists of several components, one component being the round trip latency in the write and read paths. Many of the electronics in the read and write data paths, such as the preamplifier, are temperature sensitive and voltage sensitive. These are also impacted by environmental conditions. Thus, the latency is due in part to the latency of the electronics, which varies with temperature, voltage and environmental conditions.

In some cases, testing the round-trip latency for a communication path causes the communication path to become saturated, making accurate latency measurement difficult. It can be beneficial to reduce the gain of a read and/or write path while a latency test is being performed to reduce a chance of saturation of the communication path. The embodiments disclosed herein provide examples in which the gain of a read path is adjusted for latency testing using gain control. The gain control circuitry can provide a single level of gain control or can provide a selectable or programmable level of gain control. Gain control of the communication path can be achieved in various ways. As referred to herein, the term "latency testing gain control" (LGC) may encompass one or both of attenuating a signal carried by the communication path as well as controlling the gain of one or more amplifiers in the communication path.

FIG. 1A is a block diagram of a communication system 100 capable of measuring latency of a communication path. In this case, the communication path comprises a first data path, e.g., a write data path 120 and a second data path, e.g, a read data path 130. The write path 120 can include various components, which are illustrated in FIG. 1A as portions of a controller 105, e.g., a write channel, a preamplifier 110, and write element 125. The read path 130 can also include various components, which are illustrated in this example as portions of a controller 105, e.g., a read channel, a preamplifier 110, and read element 135. In the embodiment illustrated in FIG. 1A, the write element 125 is coupled to the read element 135 through loop-back element 140. In some cases, the loop-back element 140 is disconnected during normal operation of the communication path and is connected to the communication path, e.g., using one or more switches, during latency testing. In some implementations, during latency testing, the write path 120 is driven with a latency test signal and a return signal is returned via the read path 130. Latency measurement circuitry 106 is shown in this example as being disposed in the controller 106 of the communication system 100. Latency measurement circuitry 106 is configured to measure the latency of the communication path 120, 130, based on the latency test signal driven on the write path 120 and returned on the read path 130.

In some cases, the loop-back element 140 is a DC loop-back element, meaning that the loop back element 140 is electrically resistive. In some cases, the loop-back element 140 is an AC loopback element, meaning that the loop-back element can carry AC signals and substantially blocks DC signals. For example, an AC loop-back element may comprise one or more resistors and capacitors connected in series.

If an AC loop-back element is used, the AC loop-back element can be configured to pass relatively high frequency AC latency test signals but to substantially block relatively lower frequency signals, such as those used during normal read and write operation of the communication device. Components of the AC loop-back element may be selected so that these low frequency signals are substantially unaffected by an AC loop-back element. Thus, an AC loop-back approach can eliminate the need to remove the AC loop-back element from the communication path during normal operation.

As previously discussed, due to the distribution of parameter values for a population of devices, and the variation in parameter values with environmental conditions, latency testing may cause saturation of the communication path components, leading to errors in latency measurements. According to various loop-back approaches described herein, latency test gain control (LGC) circuitry 141 is used to control the gain of at least a portion of the communication path 120, 130 to reduce or prevent saturation during latency testing. Portions of the LGC circuitry 141 can be disposed in the preamplifier 110 of the communication system 100 in some embodiments.

Figure 1B:
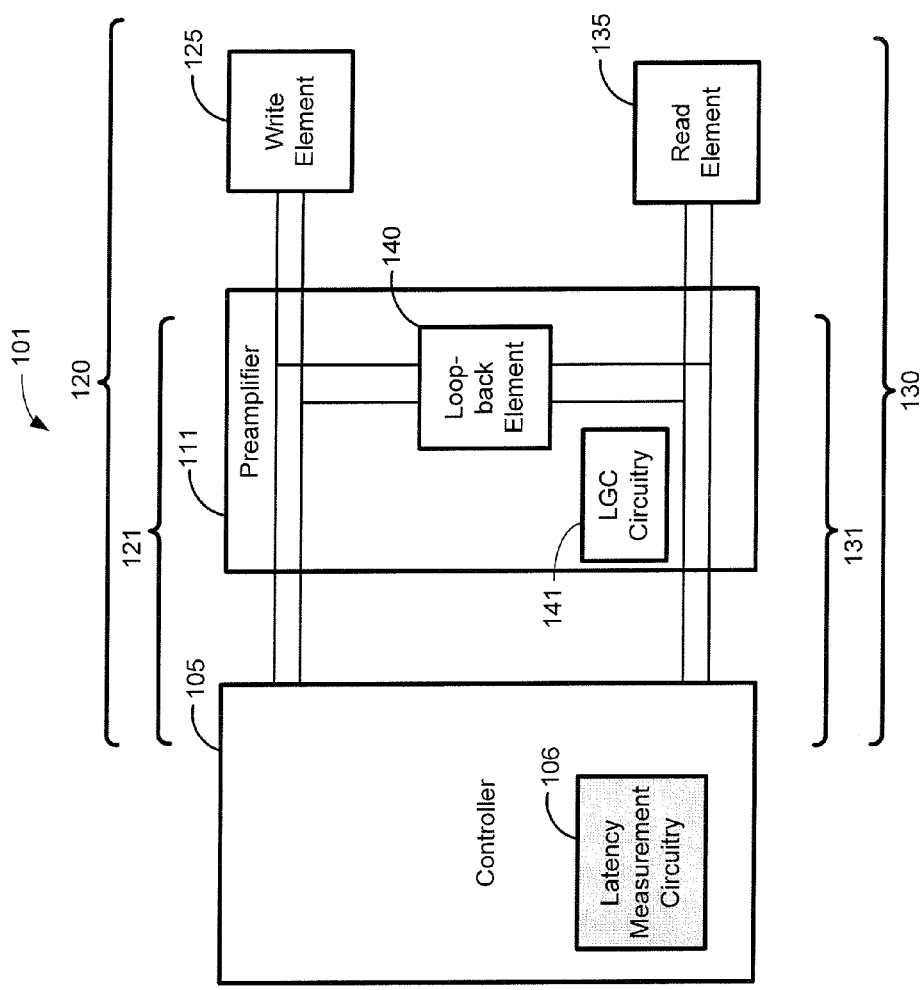

The loopback element 140 is shown in FIG. 1A as connecting the read and write paths at the write element 125 and the read element 135. Other locations for the loopback element are also possible. For example, as illustrated in FIG. 1B, loopback element 140 is arranged between the write path 120 and the read path 130 in the preamplifier 111 of communication system 101. In this position, latency testing would include a portion 121 of the write path and a portion 131 of the read path, e.g., those portions including the preamplifier and controller components and components arranged therebetween. The latency test would not include portions of the communication path between the preamplifier 111 and the write or read elements 125, 135. However, the latency tests made for a portion of the communication path may useful, such as if the latency of portions of the communication path that are not included in the latency test is small, or if the latency including these non-tested portions can be extrapolated, estimated, or otherwise obtained from the latency test of the communication path portion.

In embodiments described herein, to avoid possible saturation of the communication path, the gain of the communication path is adjusted to a test value during latency testing. For example, the gain of the read path can be adjusted by adjusting the gain of one or more amplifiers in the read path preamplifier. The gain of the read path may be returned to a nominal value after the latency test is completed.

During latency testing, the read path gain may be adjusted using latency gain control (LGC) circuitry located in the preamplifier section of the read path. For example, the LGC circuitry can include one or more of the following elements: 1) latency gain control (LGC) element and 1) circuitry that controls and/or enables the latency gain control. In some cases, the LGC element can comprise a transistor coupled to the inputs of an amplifier of the preamplifier. The LGC element can be controlled to attenuate the signal applied to the amplifier. In some implementations, the (LGC) configuration circuitry may be configured to apply an attenuation control signal to the LGC element corresponding to the amount of attenuation adjustment used during the latency test. The LGC configuration circuitry may alternatively or additionally be configured to apply a gain control signal to an amplifier of the communication path, the gain control signal reducing the gain of the amplifier during the latency test. The control signals for attenuation and/or the gain control may be programmable for a programmable attenuation or gain (as discussed below in connection with FIG. 4).

Figure 1C:
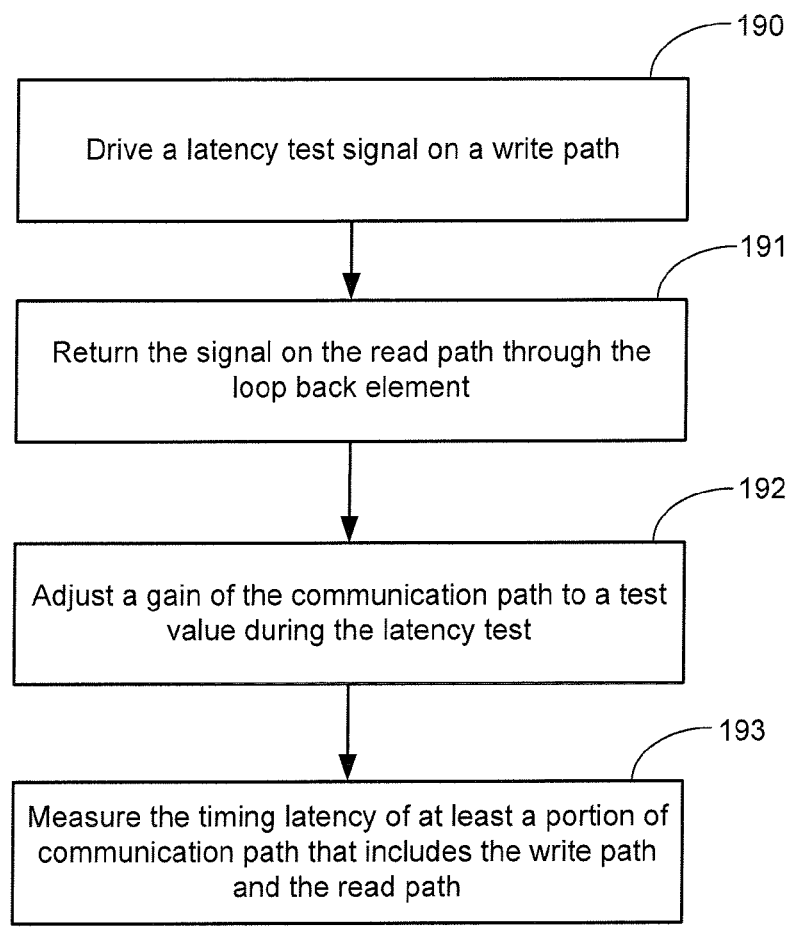
FIG. 1C is a flow diagram of a process for testing timing latency of a communication path. in accordance with embodiments described herein.

FIG. 1C illustrates a process for testing latency of at least a portion of a communication path. A latency test signal is driven 190 on a write data path. In some implementations, the latency test signal may be applied to the write data path by the controller of a memory storage device. In at least one embodiment, the latency test signal is square wave having a selected period and a selected phase. For example, the selected period may be greater than or equal to about double the expected delay of the communication path. The latency test signal is returned 191 on a read data path through a loop-back element. During the latency test, the gain of the communication path is adjusted to prevent saturation of the communication path. The latency of at least a portion of the communication path that includes the write data path and the read data path is measured 193 based on test signal and the returned signal.

Figure 2A:
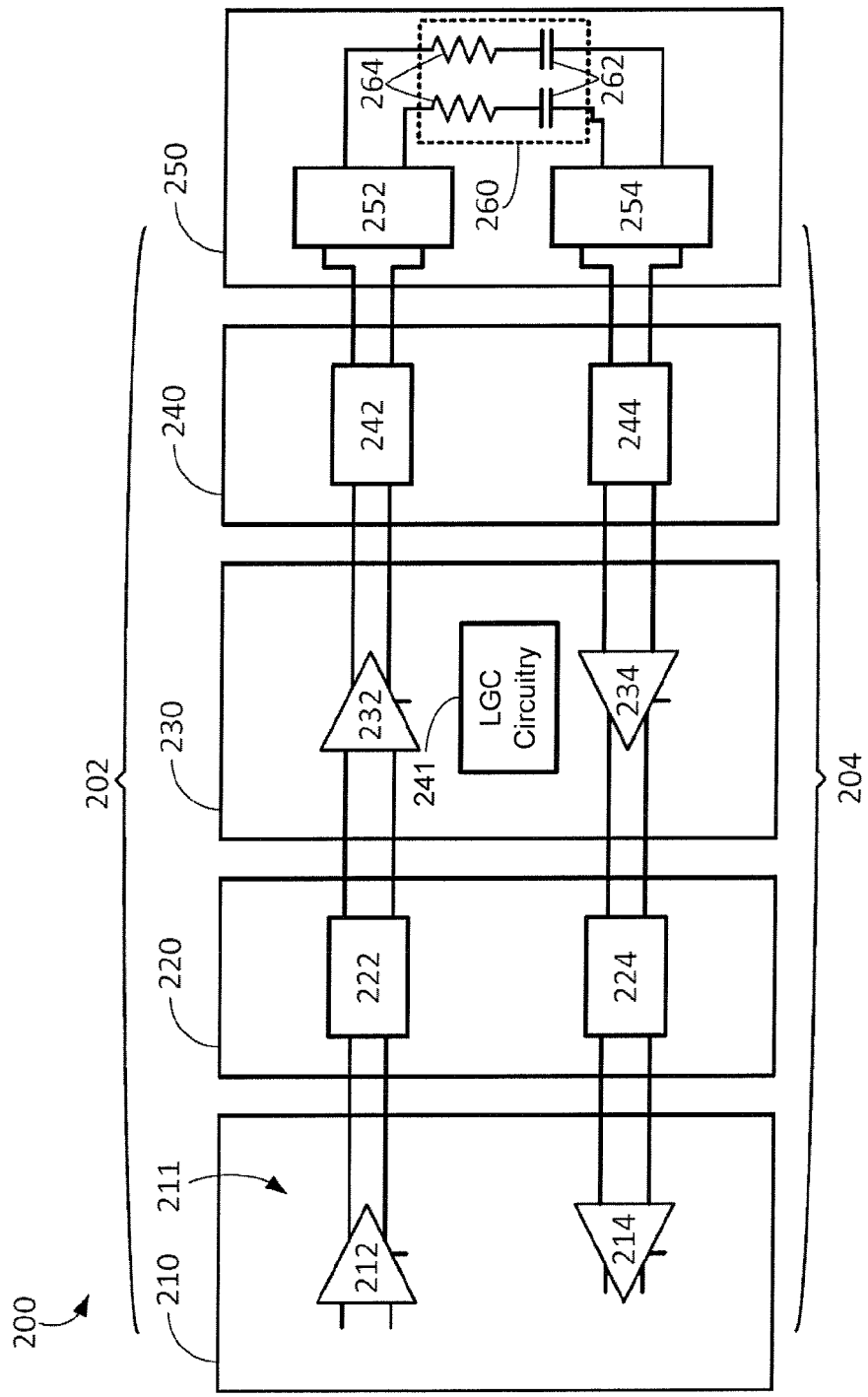
FIG. 2A is a block diagram illustrating a communication path that includes latency measurement gain control circuitry.

An exemplary system 200 for use in measuring latency of a communication device (e.g., a storage device) is depicted in FIG. 2A. The exemplary system 200 includes a controller 210, a flexible circuit and printed circuit board 220, a preamplifier 230, an interconnect portion 240, and a data communication component such as, e.g., a transducer 250. As previously discussed, a write data path 202 (or outbound path) and a read data path 204 (or inbound path) may be defined as extending through portions of the controller 210, the flexible circuit and printed circuit board 220, the preamplifier 230, the interconnect portion 240, and the transducer 250. Each of the write data path 202 and the read data path 204 may include two electrical conductors/connections to complete a circuit from the controller 210 to a write transducer 252 and a read transducer 254, respectively. The system 200 includes latency test gain control (LGC) circuitry 241. In the illustrated system 200, the LGC circuitry is arranged in the preamplifier 230 and is configured to adjust the gain of the read channel during latency testing.

The write data path 202 may be used to write data to a storage medium or otherwise transmit communication to a downstream system. For example, write data may be received by the controller 210 and transmitted from the controller 210 along the write data path 202 (e.g., through the flexible circuit and printed circuit board 220, the preamplifier 230, and the interconnection portion 240) to the transducer 250 to be written to a storage medium using the write transducer 252 located in the transducer 250. Likewise, read data may be read by the read transducer 254 located in the transducer 250 and transmitted along the read data path 204 (e.g., through the interconnection portion 240, the preamplifier 230, and the flexible circuit and printed circuit board 220) to the controller 210.

Generally, the controller 210 can be a printed circuit board or integrated circuit containing various circuitry, logic, and memory for use in the control of the storage device. The controller 210 may include, among other things, a RW channel 211, which generally provides processing of data being read from/written to a storage medium of a storage device as well as other various functions. Although, as depicted, the RW channel 211 is a portion of the controller 210, it is to be understood that the controller 210 and the RW channel 211 may be independent from one another but yet interoperate with one another for the operation of the system 200. Further, it is to be understood that the functions and/or operations of the controller 210 described herein may be performed by the RW channel 211 and/or any other portion of the controller 210, and vice versa.

For example, the RW channel 211 may include a write portion 212 and read portion 214 as depicted. The write portion 212 may be configured to code-modulate write data supplied from other circuitry of the controller 210, to convert the code-modulated write data into a write data signals, and to transmit the write data signals onto the write path 202. The read portion 214 may be configured to amplify a read data signals that are supplied on the read data path 204 so that they will have certain amplitudes, to extract data from the acquired read signal data signals, and to perform decoding processing.

In one or more embodiments, the controller 210 and/or RW channel 211 may also include various circuitry and/or apparatus that may be used to determine, or measure, the latency in a communication path which may include at least a portion of each of the write data path 202 and the read data path 204 as further described herein. In at least one embodiment, the controller 210 and/or RW channel 211 may include a phase estimation circuit configured to measure the latency of the write data path and the read data path.

The flexible circuit and printed circuit board 220 may include circuitry 222, 224 for the transmission of write data signals and read data signals along the write data path 202 and read data path 204, respectively. Generally, the preamplifier 230 may be configured to amplify write data signals transmitted along the write data path 202 and read data signals transmitted along the read data path 204 (e.g. using amplification circuitry, which may be included in the preamplifier 230). The preamplifier 230 may be configured to amplify write signals transmitted to the transducer 250 along the write data path 202 using amplifier 232 (e.g., exemplary amplification circuitry) during a write operation and to amplify read signals transmitted from the transducer 250 along the read path 204 generated by the transducer 250 using amplifier 234 during a read operation. In at least one embodiment, the preamplifier 230 may be part of the flexible circuit and printed circuit board 220. In other words, the flexible circuit and printed circuit board 220 may include the preamplifier 230, and vice versa The interconnection portion 240 connects, or couples, the preamplifier 230 to the transducer 250. More specifically, the interconnection portion 240 connects the write data path 202 from the preamplifier 230 to the transducer 250 and the read data path from the transducer 250 to the preamplifier 230. For example, as shown, the interconnection portion 240 includes circuitry 242, 244 for the transmission of write data signals and read data signals along the write data path 202 and read data path 204, respectively.

The exemplary system 200 is configured to measure latency of a communication path including at a least a portion of each of the write data path 202 and the read data path 204. To measure the latency, the exemplary system 200 may be configured to couple the write data path 202 and the read data path 204 using loop-back element 260 located in the transducer 250. More specifically, a latency measurement signal may be driven on the write data path 202 and the loop-back element 260 to transmit at least a portion of the latency measurement signal to the read data path 204 where it may be sensed and used to determine latency of the communication path. In other words, the loop-back element 260 may be described as allowing at least a portion of a latency measurement signal to be transmitted from the write path 202 to the read path 204 such that it may be used to measure latency of the write data path 202 and the read data path 204. Although the loop-back element 260 depicted in FIG. 2A is coupled to the write transducer 252 after the write path 202 is coupled to the write transducer, and likewise, to the read transducer 254 after the read path 204 is coupled to the read transducer 254, the loop-back element 260 may be described as being coupled to the write data path 202 in parallel with the write transducer 252 and to the read data path 204 in parallel with the read transducer 254.

In at least the depicted embodiment, the loop-back element 260 is shown as including a capacitor 262 and resistor 264 to provide AC coupling. In some cases, the loop-back element 260 may include the resistor 264 without the capacitor 262 to provide DC coupling. The resistor 264 alone (DC coupling) or series connected resistor 264 and capacitor 262 (AC coupling) may be selected to perform the coupling functionality of the loop-back element 260. For example, the resistor 264 and/or the capacitor 262 may be configured, or provided, to allow one or more components, or portions, of a signal (e.g., a latency measurement signal) transmitted from the write path 202 to the read path 204 to be used to measure latency of the write data path 202 and the read data path 204.

The capacitor 262 and resistor 264 may be selected and configured so as to pass frequencies at and above the fundamental frequency of the latency test signal. This avoids DC common mode components from the test to be applied to the read transducer.

Using such exemplary configurations, the loop-back element 260 will not affect the typical write operations of the write data path 202 and typical read operations of the read data path 204. In other words, although the loop-back element 260 capacitively couples the write data path 202 to the read data path 204, the loop-back element 260 does not adversely affect the normal write and read operations (e.g., normal write while read processes are not impacted because there is no write processes occurring at same time as read processes).

The controller 210 may be configured to drive, or provide, a latency test signal on the write path 202. Generally, the latency test signal is driven on the write path 202 such that the latency test signal transmits from the controller 210 along the write path 202 to the transducer 250, through the loop-back element 260 and from transducer 250 along the read path 204 back to the controller 210 (e.g., the RW channel 211). The latency test signal may be any signal capable of being transmitted through the coupling circuitry 260 capacitively coupling the write data path 202 and the read data path 204 and further capable of being used to measure latency in the communication path (e.g., at least a portion of each of the write data path 202 and read data path 204).

The latency test signal can be square wave having a selected period and a selected phase. Voltage pulses from the square wave coupled from the write data path 202 to the read data path 204 via the loop-back element 260, and therefore present at the read transducer 254, could be detrimental to the life span of the read transducer 254 when summed with an applied read transducer bias. To limit the detrimental effects the latency test signal pulses may have on the life span of the read transducer, the electrical latency measurements may be made without any read transducer bias in a Read While Write (RWW) operating mode. Under these conditions, the coupled voltage (e.g., the AC, or high frequency, components of a latency measurement signal) across the read transducer 254 may be acceptable, e.g., from a reliability perspective. In essence, the controller 210 may be configured to set a read transducer 254, or sensor, bias to zero when driving a latency test signal on the write data path 202 to measure latency.

In some cases, the slope, or change, in the latency of the write data path 202 and the read data path 204, or communication path with respect to environmental changes may be determined without measuring the actual, or absolute, delay, or latency, along the entire write and read data paths 202, 204. For example, the slope of the latency may be determined in situations in which the loop-back element 260 is located at intermediate locations along the write data path 202 and the read data path 204. For example, in some scenarios, the loopback element may be located in the preamplifier. In such a configuration, although a latency measurement signal would not travel, or be transmitted, along the entire communication path, the change, or slope, in the latency may be determined by comparing a presently measured latency to one or more previously measured latencies, which may provide the latency measurements used by the system. In other words, although the actual latency of the entire write data path 202 and the entire read path 204 was not measured (e.g., because the latency test signal was not transmitted through the entire write data path 202 and the entire read data path 204), the latency measured may be representative of, or proportional to, the latency of the entire communication path including each of the write data path 202 and the read data path 204. Since the latency measured is representative of, or proportional to, the latency of the entire communication, the latency of the entire communication path may be determined.

Figure 2B:
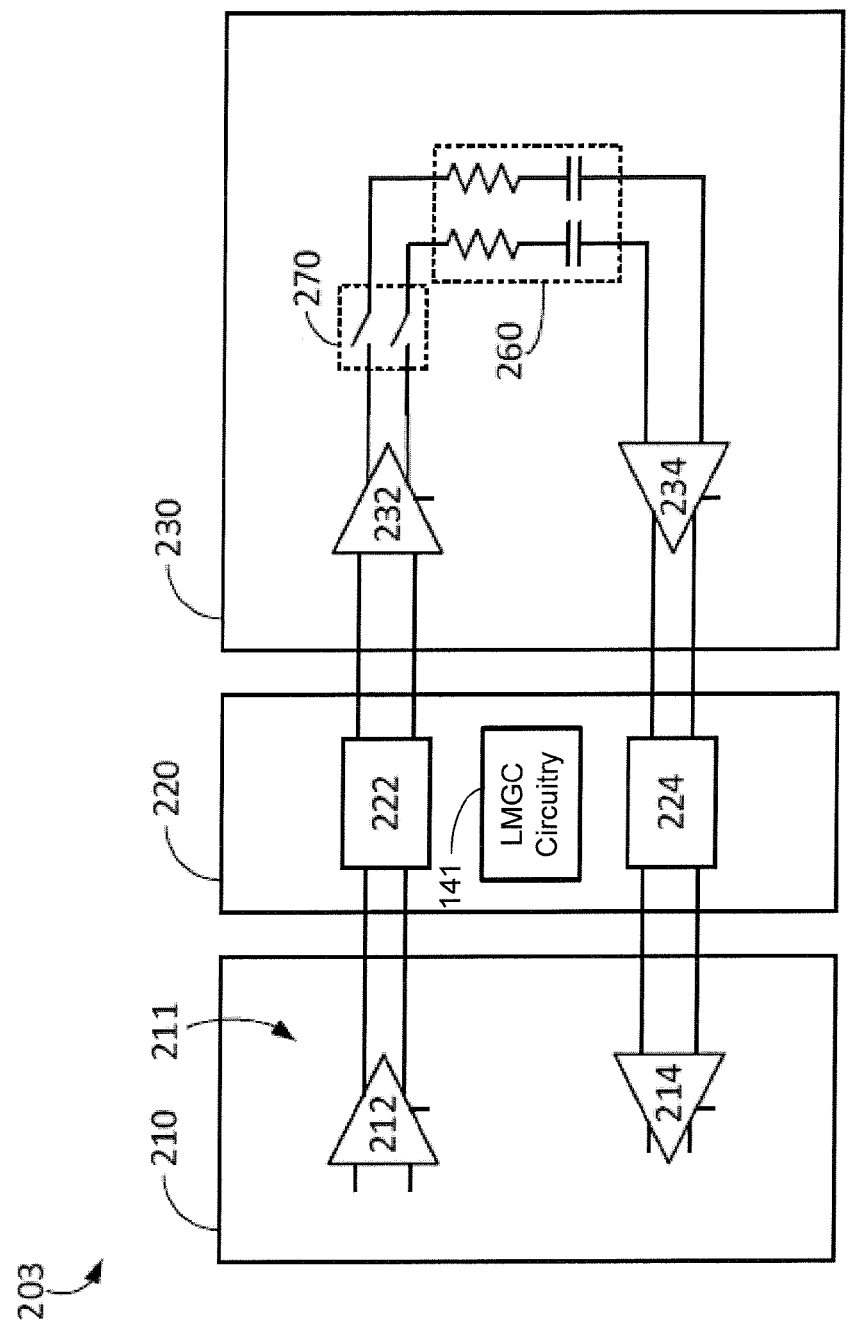
FIG. 2B is a block diagram illustrating a disconnectable loop back element in the preamplifier of the communication path.

As described herein, signal pulses from the latency test signal coupled from the write data path 202 to the read data path 204, and therefore the read transducer 254, could be detrimental to the life span of the read transducer 254. In some implementations, the loop-back element 260 can be disconnected from the communication path via switching apparatus 270 (e.g., a switch for each conductor/connection of the communication path) as shown in exemplary system 203 depicted in FIG. 2B. Although not shown, the controller 210, the RW channel 211, the flexible circuitry and printed circuit board 220, and/or the preamplifier 230 may include additional circuitry, traces, and/or logic configured to provide the functionality of the switching apparatus 270 (e.g., to open or close the switches). In other words, the controller 210 may be configured to open and close the switching apparatus 270 to directly connect the loop-back element 260 to the communication path, e.g., write data path and/or read data path2.

A process for performing latency measurement in the exemplary systems is described with reference to FIG. 3A. In this example, the latency test signal is a square wave driven in the write data path as shown by line 312. The latency test signal returned by the read data path in an exemplary system where an AC loop-back element is located in the transducer (e.g., the exemplary system 100 of FIG. 1A) is shown by line 316. The latency test signal returned by the read data path in an exemplary system where the AC loop-back element is located in the preamplifier (e.g., the exemplary system 101 of FIG. 1B) is shown by line 314.

Figure 3A:
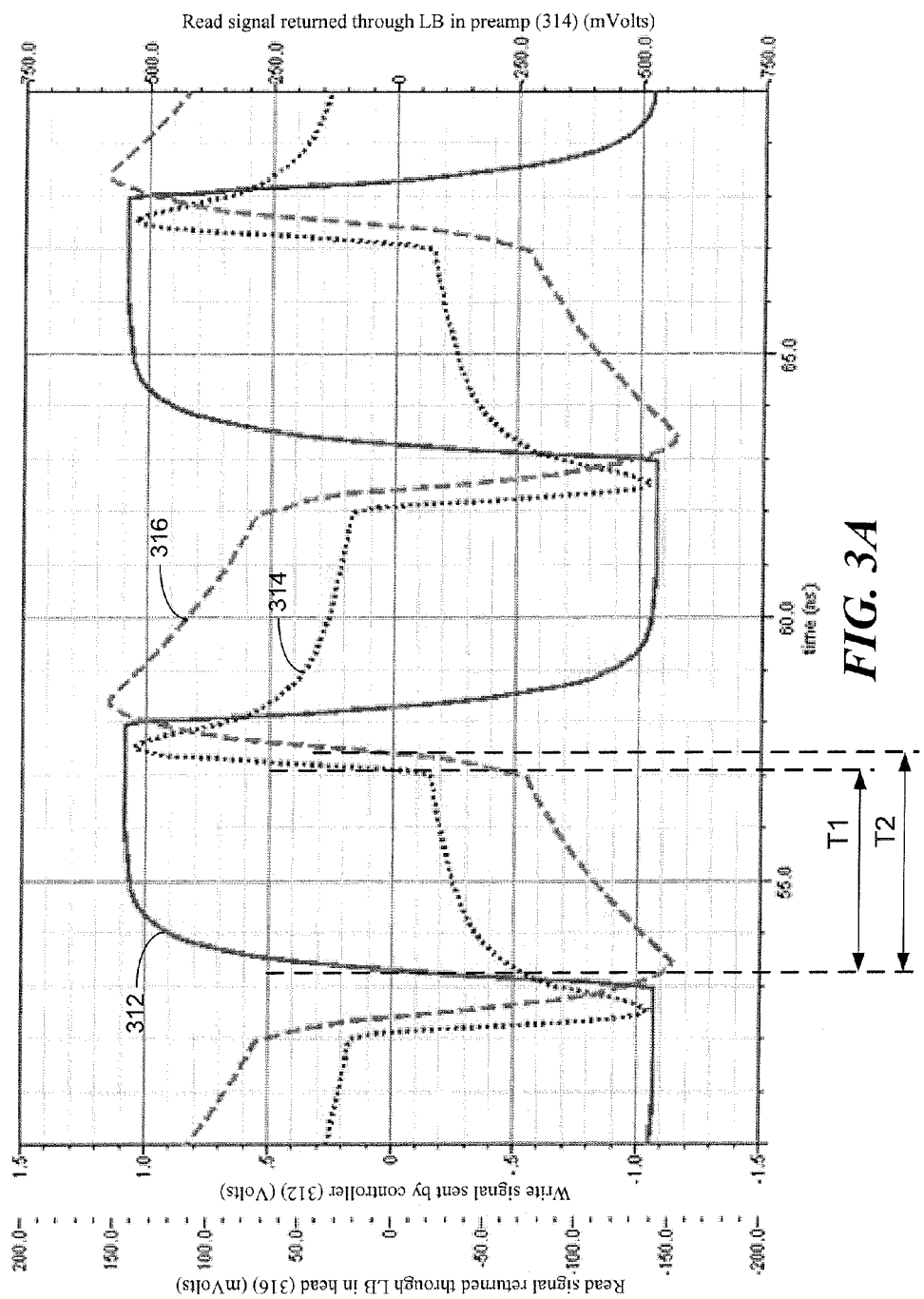
FIG. 3A illustrates timing latency test signals and return signals.

As shown in FIG. 3A, the delay between the latency test signal driven on the write path 312 and the returned latency test signals 314, 316 can be extracted from the zero crossings of the analog waveforms (e.g., the point at which the signals cross 0 voltage). For example, the time period T1 between the zero crossing of signal 312 (which may be used as a reference signal) and signal 314 may be measured to determine timing latency for systems that have a loop-back element located in the preamplifier. For systems that have a loop-back element positioned in the transducer, the time period T2, between the zero crossing of signal 312 and the zero crossing of signal 316 may be measured to determine timing latency. In other words, in at least one embodiment, a sensed latency test signal may be compared to a reference signal (e.g., using latency measurement circuitry located in the controller). Further, in at least one embodiment, comparing the returned latency test signal to a reference signal may include comparing the zero crossings of the returned latency test signal and the reference signal. As a further example, a phase estimation circuit (e.g., of the controller 210) may be configured to measure the latency of the write data path and the read data path.

Figure 3B:
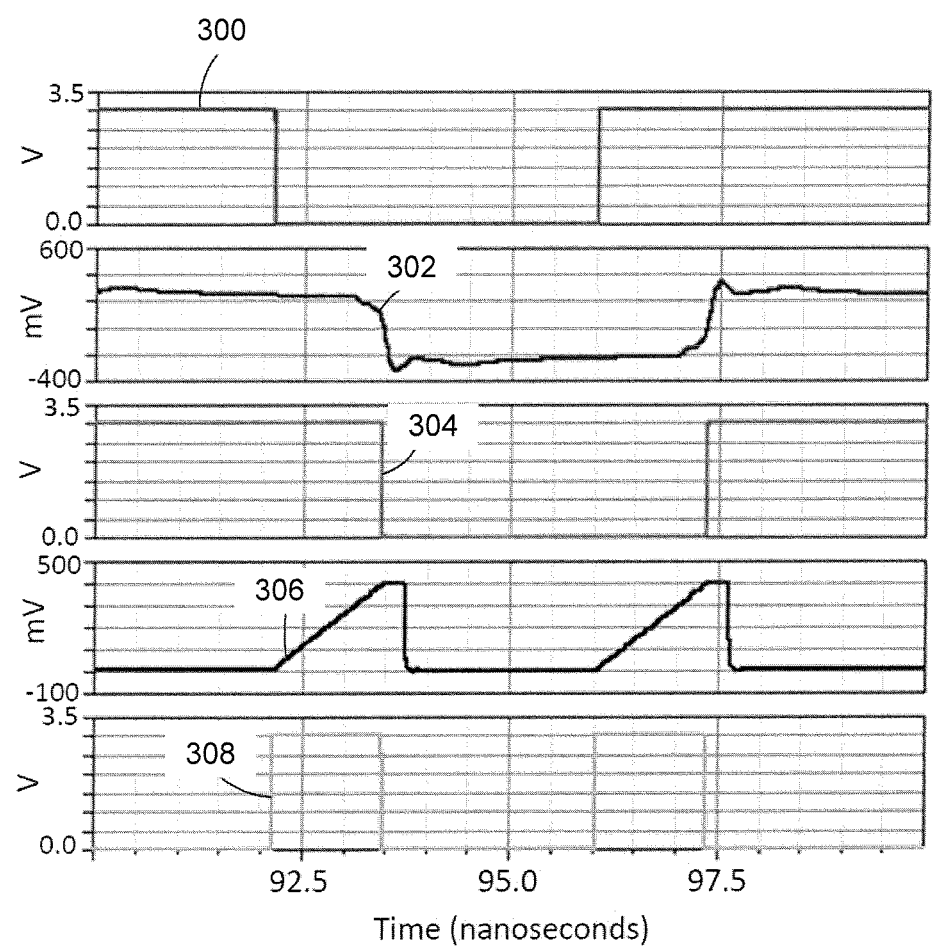
FIG. 3B shows an exemplary method for use in determining, or measuring, communication path latency.

An exemplary method for use in determining, or measuring, communication path latency is depicted in FIG. 3B. A square wave 300, which is the latency test signal in this example, may be driven, or transmitted, on the write path, and a return signal 302 may be sensed, or received, on the read path (representative of the square wave 300 after being transmitted through the communication path). A return square wave 304 may be generated based on the return signal 302, and a delay signal 306 may be generated using the slope of the exclusive OR (XOR) of the latency test square wave 300 and the return square wave 304. Further, delay pulses 308 may be generated representative of the measured latency, or delay, which may be used by the storage systems and methods for storage operations (e.g., the amplitude of the signal 306 is equivalent to the time delay pulses 308, which could be measured, digitized, and returned to a controller as a time value representing the electrical latency measured).

As previously mentioned, in some cases, the communication path may become saturated by the latency test signal, making a latency measurement difficult. In some embodiments described herein, to avoid possible saturation of the communication path, the gains of one or more components of the communication path are adjusted to test values during the testing of the latency and are set to non-test values (different from the test values) during normal operation of the communication path. For example, adjusting the gain of the communication path can involve adjusting the gain of one or more amplifiers in the read data path. The gain of the read data path may be returned to a non-test value after the testing of the timing latency.

Figure 4:
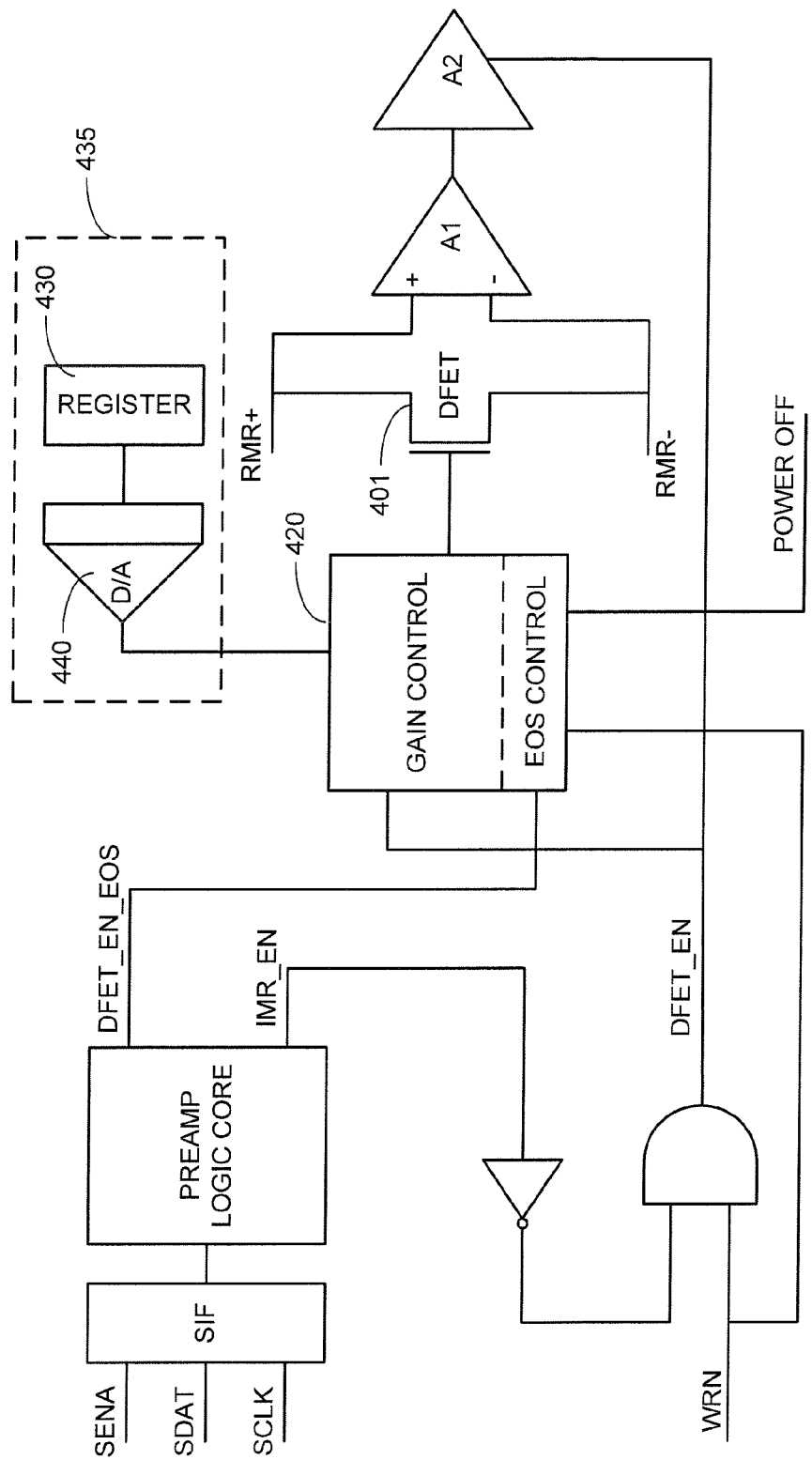
FIG. 4 is a schematic that shows portions of a read data path preamplifier illustrating latency test gain control circuitry.

The circuit diagram of FIG. 4 shows portions of a read data path preamplifier illustrating LGC circuitry. The LGC element 401 is illustrated as a p-channel depletion mode MOSFET (DFET), but in other variations an n-channel depletion MOSFET, or other devices and/or circuits may be used. In some cases, the LGC element 401 serves multiple purposes in the preamplifier section. For example, the DFET 401 may be used to attenuate the read path signal during latency testing. The DFET 401 may also be used to mitigate potential read transducer reliability issues caused by electrical overstress (EOS). One source of EOS is electrostatic discharge (ESD). FIG. 4 illustrates a configuration in which the DFET 401 is arranged to provide both EOS protection and to provide latency test gain control. In general, EOS protection may or may not be provided by the LGC element. For example, in some configurations the communication system may include EOS protection and latency test gain control wherein the EOS protection and the LGC element are implemented as separate devices or circuits. It is also possible that the communication system includes an LGC element for gain control but does not include EOS protection.

The LGC circuitry may control the gain of the read data path by one or more of attenuation of the sensed signal and reducing the gain of one or more amplifiers in the read data path. The schematic of FIG. 4 illustrates both these mechanisms. Inputs RMR+ and RMR− from the read transducer are applied to a first differential amplifier A1. The DFET 410 is arranged so that the source and drain terminals of the DFET 410 are coupled to the + and − inputs of differential amplifier A1. The input to the gate of DFET 410 is controlled by DFET gate control circuitry 420 which in this example is shown as including a GC portion and an EOS control portion.

During non-latency testing situations, the EOS control portion of the DFET gate control circuitry 420 is enabled by signal DFET_EN_EOS from the preamplifier logic core and controls the DFET 410 to provide EOS protection for the read path. When the read path preamplifier is unpowered the DFET gate control circuitry 420 connects the gate of DFET 410 to ground potential. Ground potential applied to the gate of the DFET 410 causes the DFET 410 to conduct, providing a short circuit across the Read head transducer connected at the input of amplifier A1. In this configuration, the current from an ESD is shunted through the DFET 410, and damage to components of the read path is avoided. When the preamplifier is powered on in normal operating mode, DFET gate control circuitry 420 drives the gate of DFET 410 with a voltage V+ that turns the DFET 410 off, and signals present on RMR+ and RMR− are present at the differential inputs of amplifier A1.

During latency testing, the GC portion of the DFET control circuitry 420 is enabled by signal DFET_EN to control the attenuation of the sensed signal. DFET gate control circuitry 420 applies a signal to the gate of the DFET 410, causing the DFET 410 to operate as a load across the inputs of amplifier A1, thus attenuating the signal at the amplifier A1 input. The level of attenuation can be controlled by the signal applied to the gate of DFET 410. The load (DFET resistance) across amplifier A1 when DFET_EN is in the HIGH state serves to avoid violating the input dynamic range of the preamplifier.

In some systems, the attenuation level may be a fixed level and not programmable to other levels of attenuation. In these systems, the gain control portion of the DFET gate control circuitry 420 applies a fixed voltage V+ to the gate of the DFET 410 during latency testing. In some cases, the distribution of parameter values of communication path circuitry for a population of devices varies and one value of gain control is not optimal for all devices. In this scenario, the gain control circuitry may be configured to be programmable to accommodate the distribution of parameter values. FIG. 4 illustrates optional circuitry 435 for programmable attenuation. Different voltage levels may be applied to the gate of the DFET 410 depending on the value of programmable register 430. The register 430 can be loaded, e.g., by the controller with a digital value associated with predetermined level of attenuation. The D/A converter 440 converts the digital value to an analog voltage. The analog voltage can be used directly or indirectly provide a signal that is applied to the gate of the DFET to achieve the predetermined attenuation level.

Gain control during latency testing may also be achieved by modifying the gain of an amplifier in the preamplifier. As illustrated in FIG. 4, the DFET_EN signal is used to control the gain of amplifier A2. When DFET_EN is in the HIGH state, the preamplifier read path gain is modified such that, during the latency testing, the modified gain complies with the preamplifier output dynamic range. The DFET_EN signal can be developed as the logical AND of the WRn signal (from the controller) and $\overline{\text{IMR\_EN}}$ from the preamplifier logic core. The level of WRn corresponds to whether the device is reading or writing. WRn is in a high state when the device is writing and is in a low state when the device is reading. When $\overline{\text{IMR\_EN}}$ is high, the reader bias current does not flow to the read transducer. The serial interface (SIF) allows configuration information to be passed from the controller (not shown) to the preamplifier.

Figure 5A:
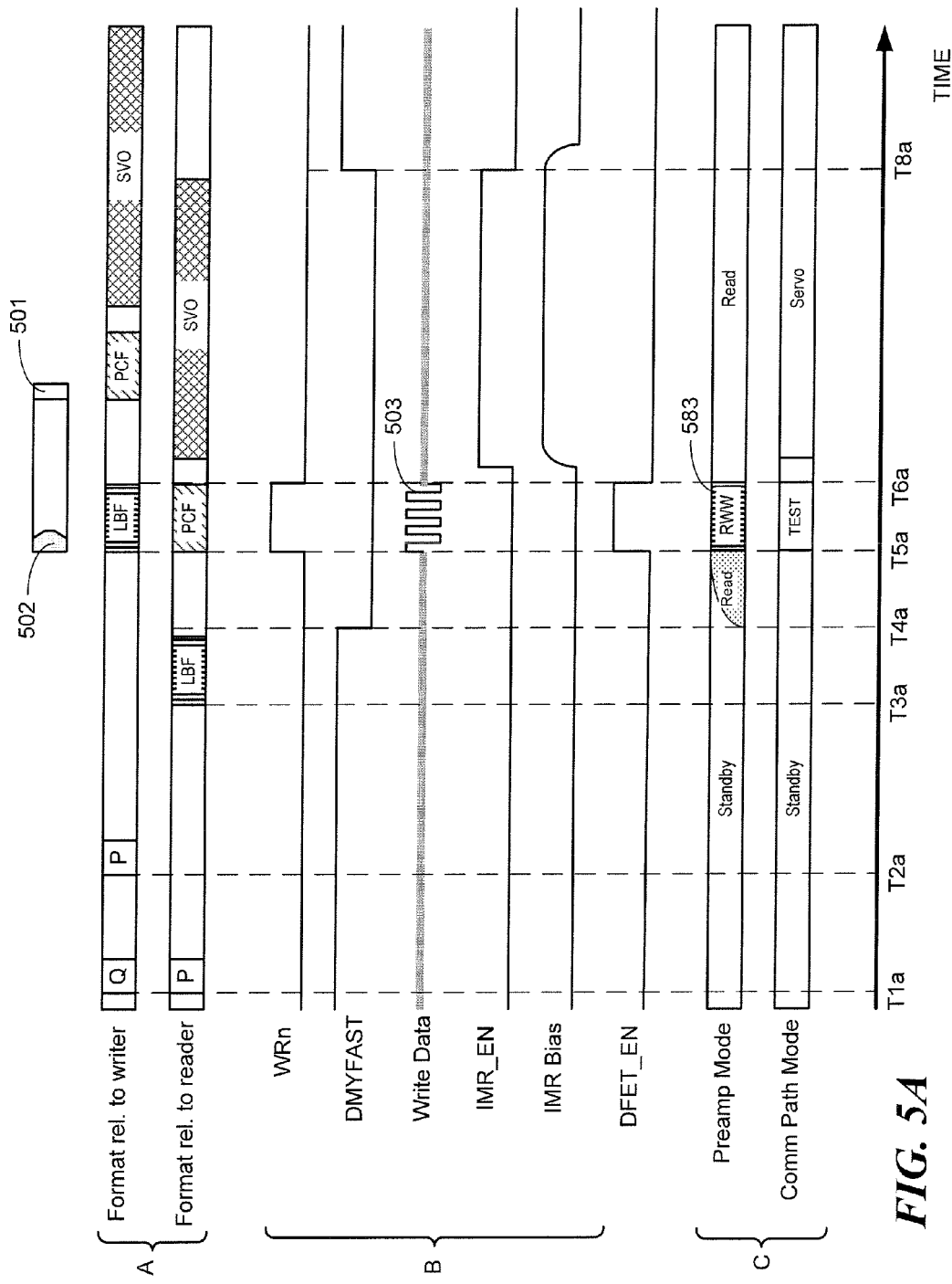
FIG. 5A is a timing diagram showing communication path signals when latency testing is initiated from standby mode.
Figure 5B:
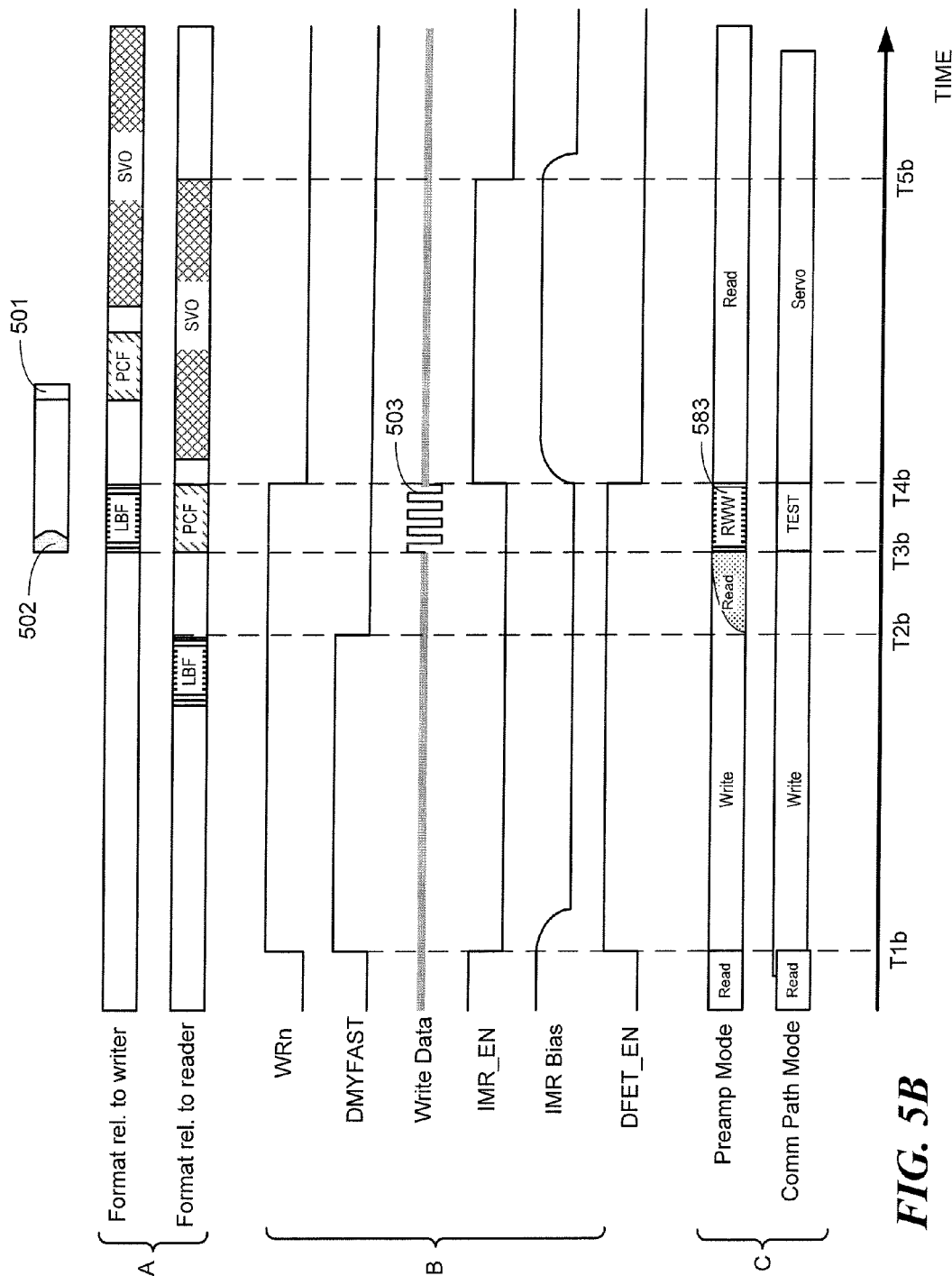
FIG. 5B is a timing diagram showing communication path signals when latency testing is initiated from write mode.

FIGS. 5A and 5B are timing diagrams that illustrate processes for testing latency in accordance with embodiments described herein. FIG. 5A shows the timing diagram when the communication device enters latency testing from standby mode. FIG. 5B shows the timing diagram when the communication device enters latency testing from write mode.

In section A of the timing diagrams, FIGS. 5A and 5B show the physical relationship between the read 501 and write 502 transducers to each other. In these examples, the read transducer 501 is ahead of the write transducer 502 on the storage media as the media moves relative to the read and write transducers. As illustrated by FIG. 5A, the read transducer 501 sees the "P" on the media at an earlier time than the write transducer 502. At time T1a, the read transducer 501 is over the area of the media marked "P" and the write transducer 502 is over the area of the media marked "Q". At a later time, T2a, the write transducer 502 reaches the "P" area of the media.

In some cases, the communication device implements latency testing just before the read/write transducers reach a servo field (SVO) on the media. The location on the media where the latency testing is performed is shown in FIGS. 5A and 5B as the loopback field (LBF). Due to the physical relationship between the read transducer and the write transducer, the read transducer 501 reaches the LBF before the write transducer. As illustrated in FIG. 5A, the read transducer 501 reaches the LBF at time T3a and the write transducer reaches the LBF at a later, at time T5a. While the write transducer is over the LBF, the read transducer is in a preconditioned field (PCF) that is formatted to reduce noise during the latency testing. During the time that the write transducer is over the LBF, a latency test is performed.

Section C of FIGS. 5A and 5B indicates the mode of the preamplifier and the mode of the communication path before, during, and after the latency testing. In FIG. 5A, the preamplifier and communication path are in standby mode prior to the latency test. Before the latency test, the preamplifier transitions to read while write (RWW) mode. The latency test (TEST) is performed while the preamplifier operates in RWW mode. Following the latency test, the preamplifier operates in read mode and the servo field on the media is read by the communication path. In FIG. 5B, the preamplifier and communication path are in write mode prior to latency testing. The preamplifier transitions to read while write (RWW) mode and the test is performed while the preamplifier operates in RWW mode. Following the latency test, the preamplifier operates in read mode and the servo field on the media is read via the communication path.

In section B of the timing diagram of FIG. 5A, the states of certain signals are shown when latency testing is initiated from standby mode. In section B of FIG. 5B, the states of these signals are shown when latency testing is initiated from write mode. The functions of the signals illustrated in Section C of FIGS. 5A and 5B are described in Table 1.

TABLE 1

| Signal Name | Function |
| --- | --- |
| WRn | Write/Read Mode. WRn is in a high state when the device is writing and is in a low state when the device is reading. |
| DMYFAST | Provides for reader circuitry wake-up prior to a read operation. Reader circuits are active when DMYFAST is low. |
| Write data | Write data represents data written to the media or the signal on the write path during latency testing. |
| IMR_EN | Enables the reader bias current to the read transducer. When the IMR_EN is high, bias current flows to the read transducer. |
| IMR Bias | Bias current to the read transducer. Bias current to the read transducer is enabled by IMR_EN. |
| DFET_EN | Active high enables the LGC element. |

During a latency test, the system drives a latency test signal 503 on the write path as if to write on the media and the test signal is returned through the read path via the loop-back element. As illustrated in the example of FIG. 5A, prior to the write transducer reaching the LBF on the media, DMYFAST (the reader circuitry control) is asserted low at T4a, and the preamplifier reader circuitry starts waking up as shown in the Preamplifier Mode timing between T4a and T5a. DMYFAST signal is asserted low at a time sufficiently preceding the time that the writer reaches the LBF to allow the reader circuitry to be active by the time the write transducer reaches the LBF. Even though the preamplifier reader circuitry is active for the latency test, the reader bias current (IMR Bias) for the read transducer is maintained to be substantially zero during the latency test. In the timing diagrams of FIGS. 5A and 5B, the reader bias current is represented by signal IMR Bias and is enabled by signal IMR_EN. When IMR_EN is high, then IMR Bias current is on and a bias current is applied to the read transducer. When IMR_EN is low, the IMR Bias current is off, and the bias current applied to the read transducer is substantially zero. Maintaining the reader bias current to a sufficiently low level, e.g., substantially zero, avoids potential damage to the read transducer that could occur if the read transducer was activated by reader bias current during the latency test.

The control signal DFET_EN is asserted during latency testing so that the gain control DFET is enabled while the writer is over the LBF. In some cases, DFET_EN=$\overline{\text{IMR\_EN}}$ AND WRn. During latency testing, the preamplifier is in RWW mode 583. The latency test signal 503 is applied to the write path and is returned on the read path via the loopback. After completion of the latency test, at time T6a, the preamplifier read circuitry and the read transducer transitions to read mode in preparation to read the upcoming servo field. DFET_EN goes low, disabling the LGC element. DMYFAST remains low to keep the reader circuitry active. After the latency test, IMR_EN transitions high, enabling reader bias current (IMR bias) to the read transducer. After the servo field is read, DMYFAST transitions high at time T8a, turning off the preamplifier reader circuits, IMR_EN transitions low, causing reader bias current (IMR Bias) to decline to substantially zero.

FIG. 5B provides a timing diagram that shows the signal timing when a latency test is initiated from write mode. At time T1b, the device enters write mode. DMYFAST is high thus the preamplifier reader circuits are not energized. IMR_EN is low, and IMR Bias is substantially zero. DFET_EN is high to enable the latency test gain control. At time T2b, DMYFAST transitions low allowing the preamplifier reader circuitry to wake up. The reader circuitry wakes up between T2b and T3b and the preamplifier enters a RWW mode at time T3b. The write data path is driven with the latency test signal 503 during the latency test period from T3b to T4b. The latency test signal is returned on the read data path via the loopback element. At time T4b, latency testing ends, IMR_EN transitions high, allowing the IMR Bias current to the read transducer. The DFET_EN control is de-asserted before the start of the servo field allowing the depletion MOSFET to turn off.

Figure 6C:
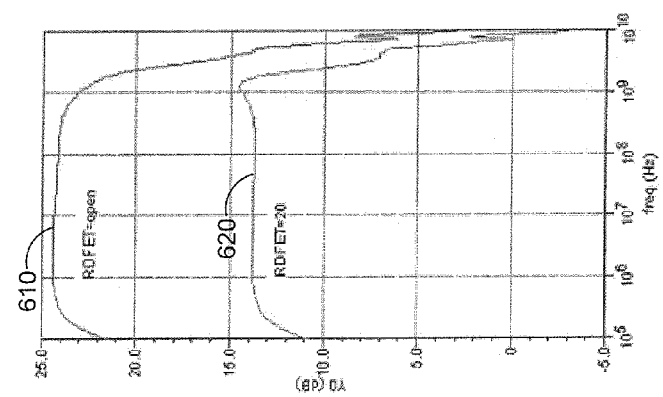
FIGS. 6A-6C illustrate the effect of gain adjustment on a return signal carried on a read data path during a latency test.
Figure 6A:
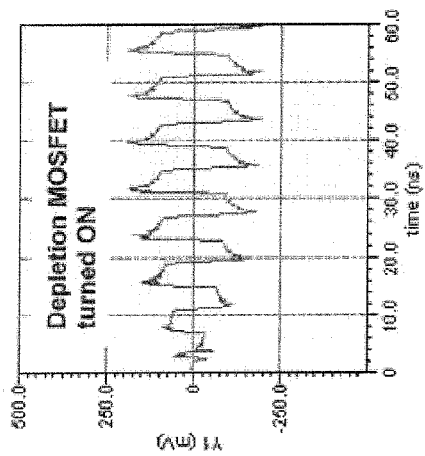
Figure 6B:
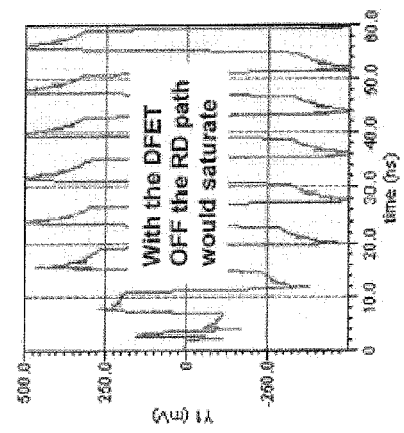

FIGS. 6A-6C illustrate the effect of gain adjustment on a return signal carried on a read data path during a latency test. As previously mentioned, the gain adjustment may come from attenuating the sensed signal by turning a DFET on and/or by controlling the gain of the read path. Turning on the DFET increases the attenuation factor from the writer to the read amplifier input and reduces the read amplifier gain. The result is that a higher write current may be used, (e.g., without reprogramming the preamplifier) for latency measurement even when the read head resistance or the gain used may have otherwise caused saturation of the read path.

FIGS. 6A and 6B are simulation results showing that, for the same write current and read head resistance, the read data amplitude is reduced when the DFET is turned on (FIG. 6A) when compared to the simulation of the read data amplitude when the DFET is off (FIG. 6B). FIG. 6C shows the gain of the read path corresponding to example scenarios discussed in connection with FIGS. 6A and 6B. Trace 610 of FIG. 6C shows the read path gain for latency test signals having a frequency between about $10^5$ to $10^{10}$ Hz with the DFET off. Trace 620 of FIG. 6C shows the read path gain for latency test signals having a frequency between about $10^5$ to $10^{10}$ Hz with the DFET on.

Figure 7:
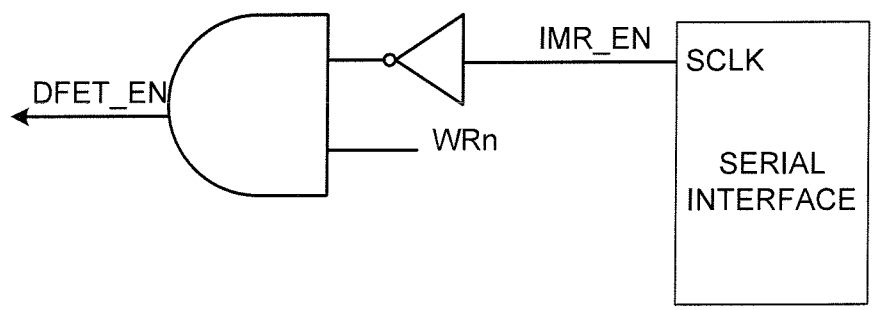
FIG. 7 is a diagram of a circuit that may be used to derive a DFET_EN signal.

FIG. 7 illustrates one example technique for developing the DFET_EN signal. In some implementations, the DFET_EN signal can be output from circuitry that is used for multiple purposes. One example includes using a output of a serial interface (SIF) of the read preamplifier to provide the DFET_EN signal during latency testing. As previously discussed, the SIF may be used to transfer serial configuration data from the controller to the preamplifier. Any output of the SIF may be used for DFET_EN so long as the timing of the use of the SIF output for DFET_EN does not conflict with the other uses for the output. For example, if SCLK is used to develop the DFET_EN signal, the SCLK signal would be used for DFET_EN during periods that it was not otherwise being used, e.g., to clock in configuration data from the controller.

As previously discussed, the reader bias current may be substantially zero during the timing latency testing to prevent potential damage to the read transducer. The signal IMR_EN enables the reader bias current. Thus, it may be useful to enable the gain control element only when the IMR_EN is low. In the example shown in FIG. 7, the SCLK output of the SIF provides the reader bias current enable IMR_EN. In this example, the inverse of the IMR_EN signal is ANDed with the Write/Read Mode signal (WRn) to produce DFET_EN. It will be appreciated that there are many other ways to derive the DFET_EN that involve dual purpose use of a signal that is used during other times for a function other than DFET_EN. The dual purpose SIF implementations discussed above may allow for the use of existing components in the read path to derive DFET_EN.

It is to be understood that this detailed description is illustrative only, and various additions and/or modifications may be made to these embodiments, especially in matters of structure and arrangements of parts. Accordingly, the scope of the present disclosure should not be limited by the particular embodiments described above, but should be defined by the claims set forth below and equivalents thereof.

What is claimed is:

1. A method to determine timing latency of a data path, comprising:
   driving a signal on a first data path;
   returning the signal on a second data path through a loop back element;
   testing the timing latency of at least a portion of the communication path that includes the first data path and the second data path using the signal returned on the second data path; and
   adjusting a gain of the second data path to a test value during the testing of the timing latency.

2. The method of claim 1, wherein:
   the second data path is a read data path coupled to a read transducer; and
   further comprising setting or maintaining a bias current of the read transducer to substantially zero during the testing of the timing latency.

3. The method of claim 1, further comprising returning the gain from the test value to a nominal value after the testing of the timing latency.

4. The method of claim 1, wherein adjusting the gain comprises adjusting a control signal applied to a transistor.

5. The method of claim 4, further comprising:
   using the transistor as an electrical overstress protection element during non-timing latency testing periods; and
   using the transistor as the gain control element during the testing of the timing latency.

6. The method of claim 4, wherein:
   adjusting the control signal comprises converting a digital value to an analog voltage; and
   applying the analog voltage to a gate of the transistor.

7. The method of claim 1, wherein adjusting the gain of the second data path comprises preventing saturation of the second data path.

8. A device, comprising:
   a first data path configured to carry a signal;
   a second data path configured to return the signal, the second data path including a gain control element;
   a loop back element that electrically couples the first data path to the second data path;
   circuitry configured to, during a timing latency test:
      control the gain element to modify the gain of the second data path,
      apply the signal to the first data path, and
      detect the return signal on the second data path,
      the circuitry further configured to determine a timing latency of at least a portion of a communication path that includes the first data path and the second data path using the return signal.

9. The device of claim 8, wherein the loop back element comprises a DC loop back element.

10. The device of claim 8, wherein the loop back element comprises an AC loop back element.

11. The device of claim 10, wherein:
    the second data path includes a differential amplifier; and
    the AC loop back element comprises a series connected resistor and capacitor sub-element for each differential input of the differential amplifier.

12. The device of claim 8, wherein the controllable gain element comprises a field effect transistor (FET) and the circuitry is configured to control the FET by applying a gain control signal to a gate terminal of the FET.

13. The device of claim 12, wherein the circuitry comprises:
    a register configured to store a digital value; and
    a digital to analog (D/A) converter configured to convert the digital value to an analog signal, wherein the analog signal is used as the gain control signal.

14. The device of claim 8, wherein the second data path is coupled to a read transducer and the circuitry is further configured to maintain a bias current of the read transducer to substantially zero during the timing latency test.

15. The device of claim 8, wherein:
    the first data path comprises a write data path including a write transducer; and
    the second data path comprises a read data path including a read transducer;
    the loop back element couples the read data path to the write data path at the read transducer and the write transducer.

16. The device of claim 8, wherein:
    the first data path comprises a write data path including a preamplifier circuit;
    the second data path comprises a read data path including a read preamplifier circuit; and
    the loop back element couples the read data path to the write data path at the read preamplifier circuit and the write preamplifier circuit.

17. The device of claim 8, wherein the device is a hard disk drive.

18. A device, comprising:
    a first data path configured to carry a signal;
    a second data path configured to return the signal, the second data path including a differential amplifier and a gain control element, the gain control element comprising a field effect transistor (FET) coupled to the inputs of the differential amplifier;
    a loop back element that electrically couples the first data path to the second data path;
    circuitry configured to, during a timing latency test:
       control the gain element to modify the gain of the second data path,
       apply the signal to the first data path, and
       detect the return signal on the second data path,
       the circuitry further configured to determine a timing latency of at least a portion of a communication path that includes the first data path and the second data path using the return signal.

19. The device of claim 18, wherein the FET is configured to prevent saturation of the differential amplifier when the return signal is carried on the second data path.

20. The device of claim 18, wherein the FET is arranged to provide electrical overstress protection for the second data path during non-timing latency test periods.

* * * * *